(12) United States Patent
Zhang et al.

(10) Patent No.: US 11,699,099 B2
(45) Date of Patent: Jul. 11, 2023

(54) CONFIDENCE VOLUMES FOR EARTH MODELING USING MACHINE LEARNING

(71) Applicant: QUANTICO ENERGY SOLUTIONS LLC

(72) Inventors: Barry F. Zhang, Houston, TX (US); Orlando De Jesus, Frisco, TX (US); Tuna Altay Sansal, Pearland, TX (US); Edward Tian, Houston, TX (US)

(73) Assignee: QUANTICO ENERGY SOLUTIONS LLC, Houston, TX (US)

( * ) Notice: Subject to any disclaimer, the term of this patent is extended or adjusted under 35 U.S.C. 154(b) by 314 days.

(21) Appl. No.: 17/082,399

(22) Filed: Oct. 28, 2020

(65) Prior Publication Data

US 2022/0129788 A1 Apr. 28, 2022

(51) Int. Cl.
| | | |
|---|---|---|
| *E21B 49/00* | (2006.01) | |
| *G06N 20/00* | (2019.01) | |
| *E21B 44/02* | (2006.01) | |
| *G05B 13/02* | (2006.01) | |

(52) U.S. Cl.
CPC ............ *G06N 20/00* (2019.01); *E21B 44/02* (2013.01); *E21B 49/00* (2013.01); *G05B 13/0265* (2013.01); *E21B 2200/20* (2020.05)

(58) Field of Classification Search
CPC ............ E21B 2200/20; E21B 2200/22; E21B 47/009; E21B 49/00; E21B 47/003
See application file for complete search history.

(56) References Cited

U.S. PATENT DOCUMENTS

| | | | |
|---|---|---|---|
| 11,473,407 B2 * | 10/2022 | Tang | ................. E21B 41/00 |
| 2003/0046006 A1 | 3/2003 | Eastwood et al. | |
| 2009/0114445 A1 | 5/2009 | Dashevskiy | |
| 2021/0222552 A1 * | 7/2021 | Gao | ................. G06N 20/00 |
| 2021/0303965 A1 * | 9/2021 | Yin | ................. G06N 3/04 |
| 2021/0326721 A1 * | 10/2021 | Zhang | ................. G06N 3/084 |
| 2022/0004919 A1 * | 1/2022 | Zhang | ................. G06K 9/6256 |
| 2022/0083873 A1 * | 3/2022 | Ramey | ................. G06N 7/005 |
| 2022/0091291 A1 * | 3/2022 | Zhang | ................. G01V 1/282 |
| 2022/0156595 A1 * | 5/2022 | Kadayam Viswanathan ............... G06N 3/0454 |

(Continued)

FOREIGN PATENT DOCUMENTS

| | | |
|---|---|---|
| EP | 3101599 A2 | 12/2016 |
| WO | 2021040791 A1 | 3/2021 |
| WO | 2021211149 A1 | 10/2021 |

OTHER PUBLICATIONS

International Search Report/Written Opinion issued to PCT/US2021-053827 dated Jan. 20, 2022.

(Continued)

*Primary Examiner* — Kenneth L Thompson
(74) *Attorney, Agent, or Firm* — Patterson + Sheridan, LLP (57) ABSTRACT

Aspects of the present disclosure relate to confidence volumes for earth modeling using machine learning. A method includes receiving detected data, wherein the detected data includes formation attributes relating to one or more depth points along or near a wellbore. The method further includes providing inputs to a plurality of machine learning models based on the detected data. The method further includes receiving output values from the plurality of machine learning models based on the inputs. The method further includes determining a measure of variance among the output values. The method further includes generating a confidence indicator related to the output values based on the measure of variance.

15 Claims, 5 Drawing Sheets

(56) References Cited

U.S. PATENT DOCUMENTS

2022/0243575 A1* 8/2022 Kristensen .............. E21B 44/02
2022/0333477 A1* 10/2022 Kalyanraman ......... E21B 44/00

* cited by examiner

CONFIDENCE VOLUMES FOR EARTH MODELING USING MACHINE LEARNING

BACKGROUND OF THE DISCLOSURE

Field of the Disclosure

The present disclosure generally relates to confidence volumes for earth modeling methods using machine learning.

Description of the Related Art

Earth models are well recognized as a preferred means of creating and optimizing well paths, as they allow a user to visualize the reservoir, the geology at an intended wellbore landing zone, as well as zones above and below that which may present hazards or other drilling opportunities. However, earth models are often cumbersome to deal with and require complex software and specialized expertise to manipulate.

One of the main methods to create earth models is through a seismic inversion process that can be difficult and time consuming. Seismic inversion generally requires a high level of geophysical expertise and conditioned seismic data with proper well logs as inputs. In addition, the entire process of generating a seismic inversion is generally very expensive, and suffers from accuracy issues depending on the vintage of the survey and design parameters. Furthermore, manually harmonizing structural interpretations between earth models and seismic volumes is a difficult process. For at least the foregoing reasons, earth models are not often updated and/or are updated at a frequency that is less than optimal. Even if earth models could be updated more frequently, manual users would have difficulty in reliably evaluating output data streams with enough time to adapt to updated formation features that may prove hazardous to drilling.

Conventional physics-based modeling techniques fail to update inversions programmatically because substantial human interpretation and geophysics expertise is needed to update models according to conventional practice.

Some techniques involve the use of machine learning models as a complement to inversion earth models. However, both manual methods and conventional techniques involving machine learning models have limitations, such as limited sampling, lack of training data, and unknown reliability.

Conventional techniques are limited to application of a single machine learning model. Since the selected machine learning model evaluates only a single corresponding learning algorithm, it is rendered statistically inferior as a result of local optima of the training, lack of generalization and other uncertainty associated with input selection, model complexity determination, learning termination criteria and data partitioning for the training, validation and testing. Furthermore, it may be difficult to determine a confidence level of predictions produced by models using conventional techniques, and so the reliability of such predictions may be unclear until actual measured values are received and compared to the predictions.

SUMMARY OF THE DISCLOSURE

Aspects of the present disclosure relate to confidence volumes for earth modeling using machine learning. Certain embodiments include: receiving detected data, wherein the detected data includes formation attributes relating to one or more depth points along or near a wellbore; providing inputs to a plurality of machine learning models based on the detected data; receiving output values from the plurality of machine learning models based on the inputs; determining a measure of variance among the output values; and generating a confidence indicator related to the output values based on the measure of variance.

Certain embodiments include a non-transitory computer-readable medium and/or a system comprising one or more processors and a memory storing instructions to perform operations such as the method outlined above.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure relate to improvements related to earth modeling involving the use of confidence volumes for machine learning processes. In some aspects, variance among outputs from a plurality of machine learning models may be used as an indicator of confidence.

A neural network (sometimes referred to as an artificial neural network or ANN) is generally based on a biological brain, and includes a plurality of interconnected nodes or "neurons". Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network. A shallow neural network generally includes only a small number of "hidden" layers between an input layer and an output layer. By contrast, a deep learning model, such as a deep neural network, deep belief network, recurrent neural network, or convolutional neural network, generally includes a larger number of hidden layers.

In certain embodiments, the model uses multiple inputs to generate one or multiple outputs. The inputs can be taken at the same or different depths (or times) of the outputs to be produced. The individual inputs (e.g., $p_1, p_2, \ldots, p_R$) are weighted by the corresponding elements (e.g., $w_{1,1}, w_{1,2}, \ldots, w_{1,R}$) of the weight matrix W. Each neuron has a bias b, which is summed with the weighted inputs to form the net input $n = Wp + b$. The net input n is then applied to a transfer function $f$. The transfer function can be a linear or nonlinear function of n. A particular transfer function is selected based on the problem to solve. Typical transfer functions are linear, hard limit, hyperbolic Tangent Sigmoid (tansig), Log-Sigmoid (logsig) or Competitive functions. The output of a neuron a can be defined as $a=f(Wp+b)$. In certain embodiments, the transfer function can be an objective function, such as a cost function.

A single-layer network of S neurons will operate over a vector of inputs p to generate an output a, while a combination of layers will create a multilayer neural network. A layer whose output is the network output is the output layer. The other layers are called hidden layers. After the architecture is defined, the next step is training the multilayer neural network. One example training method is called backpropagation, which is a generalization of the Least Mean Square error or LMS algorithm. Backpropagation is an approximate steepest descent algorithm, in which the performance index is mean square error. The general steps are: propagate the inputs forward to the network, then calculate the sensitivities backward through the network and use the sensitivities to update the weights and biases using a steepest descent rule. The process is repeated until the objective function is minimized, a number of iterations is executed, or the error of an alternate set of data increases after a few iterations.

Neural networks are a technology well-suited to finding the non-linear correlations that exist among large data sets. Neural networks have been applied in certain contexts related to oil and gas exploration, including litho-faces analysis, detection of microseismic events, seismic inversion, and the like.

In the present solution, inputs used to train a machine learning model such as a neural network may include a wide variety of information types, including seismic volumes (both pre- and post-stack), seismic geologic maps, seismic images, electromagnetic volumes, checkshots, gravity volumes, horizons, synthetic log data, well logs, mud logs, gas logs, fluid samples, well deviation surveys, isopachs, vertical seismic profiles, microseismic data, drilling dynamics data, initial information from wells, core data, gamma, temperature, torque, differential pressure, standpipe pressure, mud weight, downhole accelerometer data, downhole vibration data, and combinations thereof. In certain embodiments, inputs may include gamma, resistivity, neutron, density, compressional, and/or shear logs. In certain embodiments, attributes from different depth points are used as training data along with adjacent waveforms from a plurality of directions (e.g., above, below, to the sides such as left and right, forward, and/or backward) with respect to each depth point.

In general, machine learning models, such as neural networks, use weighting values in order to adjust a relative contribution of each input variable to the overall model. Mathematically speaking, each weighting value is a coefficient in the equation being resolved (objective function). In other words, each weighting value applies a unique scaling factor to its respective input variable in the objective function.

Supervised training methods generally involve providing training inputs to a model, comparing outputs of the model to labels that have been assigned to the training inputs, and iteratively adjusting parameters of the model until the outputs match the labels. Labels correspond to parameters that are output by the model, and represent actual "known" values for these parameters for a given set of training inputs. For example, labels may be assigned to a given set of training inputs based on a correlation between the given set of training inputs and a particular value for a parameter that was measured or determined at the time the training inputs were measured or determined. Parameters output by the model may include, for example, rock properties and geomechanics, gamma, resistivity, neutron, density, acoustic impedance and velocity, stress, brittleness, Young's modulus and Poisson's ratio, mud weights, compressive strength, friction angle, pore pressure attributes, fracture gradients, wellbore stability, petro-physical properties, total organic content, water saturation, porosity, permeability, lithofacies classifications, and/or the like.

In certain embodiments, after a model has been trained, measurements collected by a well operator (e.g., gamma, resistivity, neutron, density, compressional, shear, temperature, torque, differential and standpipe pressure, mud weight, fluid pressure, checkshots and/or the like) and, in certain embodiments, parameters derived from the measurements (Young's modulus, Poisson's ratio, fracture gradient, pore pressure, and/or the like), are provided as inputs to the model, and the parameters output by the model, including parameters at various depth points and in a reference window around each depth point, such is in XY space and/or Z space, are used to generate earth models. Input parameters may be continuously measured and provided to the model to produce updated outputs so that an earth model can be updated in real-time.

Conventional techniques use a single machine learning model. Since each machine learning model applies only a single corresponding learning algorithm, many models prove to be suboptimal for a majority of formations. Furthermore, conventional techniques may not provide any indication of confidence with respect to predictions generated by a model. Aspects of the present disclosure can avoid the suboptimal use of a single learning algorithm across varied formation types, depths, conditions, etc. (i.e., different problem types), by employing modeling ensembles combining multiple machine learning models having different learning algorithms. According to certain embodiments, variance in outputs from a plurality of machine learning models is used as a measure of confidence. For example, if predictions output by the models in an ensemble have a high amount of variance then a confidence value for the predictions may be low, while a low amount of variance may result in a high confidence value. In alternative embodiments, high variance may result in high confidence while low variance may result in low confidence.

As used herein, "confidence" generally refers to a measure of the likely accuracy of one or more outputs from a machine learning model. For example, high confidence may mean that a prediction output by a machine learning model is highly likely to be accurate, while low confidence may mean that the prediction is less likely to be accurate.

Variance in a data set may be calculated in a variety of ways. In one example, variance is calculated by determining the average of all values in a data set (e.g., all predictions for a certain parameter at a certain depth point that have been output by a plurality of machine learning models), subtracting the mean from each value in the data set and squaring the result of the subtraction for each value, and then determining the average of those squared differences. In some embodiments standard deviation is used in connection with the confidence determination, such as to determine an upper and lower bound for parameters. For example, the standard deviation from the mean for a given parameter at a given depth point may be used to determine a "channel" within which the value is predicted to fall. The standard deviation may be determined, for example, by taking the square root of the variance.

In some embodiments, a confidence volume is generated. For instance, a confidence volume may be a model that indicates a level of confidence of each value that is represented in the model, such as by a difference in color, pattern, shading, or some other attribute. In one example, a confidence volume corresponds to an earth model, and includes an indicator of confidence for values plotted in the earth model. Confidence indicators may be provided in other ways, such as in the form of confidence values.

Confidence may be used in a variety of ways to improve techniques related to earth modeling. For example, confidence indicators provided with an earth model (e.g., in the form of a confidence volume) may allow for improved decision-making based on the earth model. In some embodiments, confidence values are used to improve the earth model, such as by selecting values in the earth model based on which predictions have the highest confidence values. In certain embodiments, confidence values may be used to eliminate predictions with low confidence or that fall outside of the standard deviation for a data set. In certain embodiments, confidence values are used as part of an ensemble process by which outputs from a plurality of machine learning models are synthesized. For instance, models that produce predictions with higher confidence values may be favored in the ensemble process over models that produce predictions with lower confidence values. These are included as examples, and confidence values may be used in other ways to improve processes related to earth modeling.

Use of techniques described herein can help enhance and "operationalize" earth models for any organization. In certain reservoirs, the earth model can be used to optimize well placement, and as the well is being drilled, the earth model can be updated to ensure the well is landed in and staying in the desired zone. As the models are continuously updated, techniques described herein are dynamic and not static like traditional inversions. The models can be quickly updated when new well information becomes available without the requirement to re-run the entire process. The eventual product of techniques described herein may be a geocellular model that may be directly input into reservoir simulators.

Use of techniques described herein provides companies with the ability for improved decision making regarding whether a given area is worthy of development, deciding on a well placement and well path, adjusting drilling mud weights or the design of casing strings to avoid wellbore instability events, and optimizing well completion designs. Decisions made based on earth models generated and updated in real-time using techniques described herein can significantly improve the human and environmental safety of drilling operations as well as the initial production rates and estimated ultimate recovery for an operator's well program across a project area. These are all important decisions with potential impacts in the millions to billions of dollars.

Utilizing an accurate, geomechanical earth model ensures that these key decisions are made optimally. Embodiments of the present disclosure incorporate highly supervised machine learning models that greatly reduce risk and uncertainty critical to making strategic, tactical decisions, and calculating value of information. Additional properties of interest can be derived from databases with calibration points. Cross validation using blind well methods decreases the chances of the network being over-trained and ensures the quality of the method.

The techniques described herein are driven by data, and are not restricted by a convolutional model biased by human interference. Furthermore, embodiments of the present disclosure reduce the overall timeline and budget of an earth modeling project.

The ability to predict earth properties in real-time as well as to determine confidence of predictions using techniques described herein allows for adjustments in mud weight or the design of casing strings to avoid pressure kicks, which can lead to blowouts, and re-orient course to avoid pressure pockets or faults, both of which have safety and financial consequences, respectively. Furthermore, updating the earth model in real-time or near real-time according to embodiments of the present disclosure for a given radius, such as 0.5 to 1 mile, around the latest real-time log (both a measured log or a synthetically derived log) measurement depth allows the driller to see these earth properties ahead of the drill bit. This is an improvement over conventional techniques in which earth models may take weeks to months to update, and where the driller cannot see updated earth property information ahead of the bit.

In particular embodiments, an earth model is created by finding non-linear ties between well log data and a seismic image volume in a statistical fashion. The process preserves realistic output without the specification of somewhat arbitrary constraints as in done in traditional seismic inversion, as the machine learning model is able to learn the underlying physics as a part of the network training process.

Machine learning model training can be flexible in terms of the type of data that is input and output. Certain embodiments involve a workflow that is based on traces extracted along wellbores where control data (density and compressional slowness logs) have been recorded or derived synthetically. In addition to the well and seismic data, interpreted maps such as isopachs, average porosity, depth, etc. as derived from well logs can be included as constraints during the training process. This allows the inversion not only to discover the inherent physics at play but also to allow the intuitions of the interpreter to guide the output. In one example, isopach, depth, and average porosity maps interpreted from wells, wells logs with density/sonic slowness, and wells logs with density/neural network-derived synthetic sonic are used to train a machine learning model.

Another additional benefit of techniques described herein is the dramatic simplification of a standard earth modeling workflow. The operational outcome of techniques described herein includes a shorter and less labor-intensive project lifespan, with reduced need for specialized software. In short, embodiments of the present disclosure have been shown to be a potential enabler for timely earth model generation for day-to-day decision making regarding acreage acquisition, well placement, field development, and the like.

Figure 1:
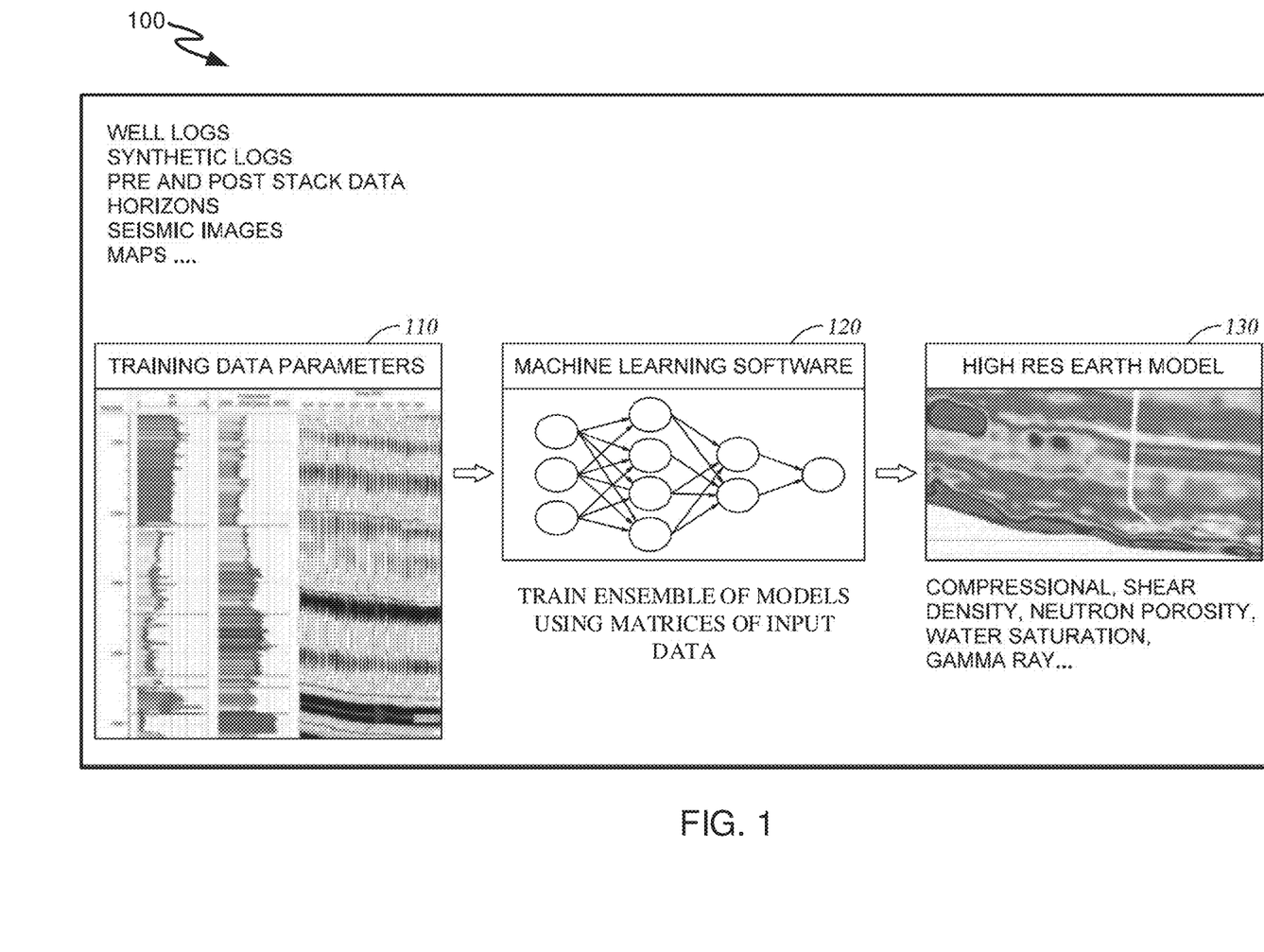
FIG. 1 illustrates an example related to earth modeling using artificial intelligence.

FIG. 1 illustrates an example 100 related to earth modeling using artificial intelligence.

Training data parameters 110 are based on a variety of training inputs, such as well logs, synthetic logs, pre and post stack data, horizons, seismic images, maps, and the like, and include labels indicating values for various output parameters of the model (e.g., including geomechanical, wellbore stability, pore pressure, and/or petrophysical attributes), such as compressional, shear, density, neutron, porosity, water saturation, gamma, resistivity, elastic properties such as Young's modulus and Poisson's ratio, acoustic impedance and velocity, stress, brittleness, mud weights, compressive strength, friction angle, pore pressure attributes, fracture gradients, total organic content, permeability, lithofacies classifications, and the like. In certain embodiments, the training data parameters 110 include parameters at a plurality of depth points along with adjacent waveforms for each depth point in a plurality of directions, such as within a reference window in XY and/or Z space (e.g., upward, downward, left, right, forward, and/or backward).

An ensemble of machine learning models 120 is trained based on training data parameters 110, such as by using a matrix of input data for each machine learning model. A given machine learning model 120 may comprise a plurality of layers with interconnected nodes. In certain embodiments, the machine learning model 120 can be a multi-input multi-output (MIMO) model (e.g., a MIMO neural network). In certain embodiments, the MIMO model can improve lateral continuity and/or consistency of simulation data compared to a conventional multi-input single-output (MISO) model. In certain embodiments, the MIMO model involves shared network inputs and hidden-layer connecting parameters. In certain embodiments, the MIMO model can predict multiple logs using a single network model. In certain embodiments, the MIMO model can have constraints of multiple logs built-in to training outputs. In certain embodiments, the MIMO model can provide self-consistent predictions. In certain embodiments, the MIMO model can lower training cost, lower calibration cost, streamline model compute time, and/or make model management easier. In certain embodiments, the machine learning model 120 can be updated ahead of the bit to improve well placement, kick avoidance, loss avoidance, changes to mud weight, drilling efficiency, and/or locating casing points.

Once trained, the ensemble of machine learning models 120 is used to produce an earth model 130, which models various parameters output by the machine learning models in the ensemble, such as compressional, shear, density, neutron porosity, porosity, water saturation, gamma ray, and the like. Parameters may be output by the machine learning models 120 in real-time or near real-time, and may include parameters at various depth points as well as adjacent parameters (e.g., waveforms) in a plurality of directions with respect to each depth point. As such, techniques described herein provide real-time properties both at the bit position and ahead of the bit position. Accordingly, an earth model can be determined and continuously updated, allowing improved decisions to be made in real-time with respect to a given well.

As mentioned earlier, conventional techniques involve the use of a single machine learning model. Embodiments of the present disclosure involve an ensemble of machine learning models 120 that allows for the determination of confidence values for predictions produced by the models based on variance. For example, each model in the ensemble may output a respective prediction for a given parameter, and the variance among the predictions from the models may be used to determine confidence for the predictions. This is described in more detail with respect to FIG. 2.

Figure 2:
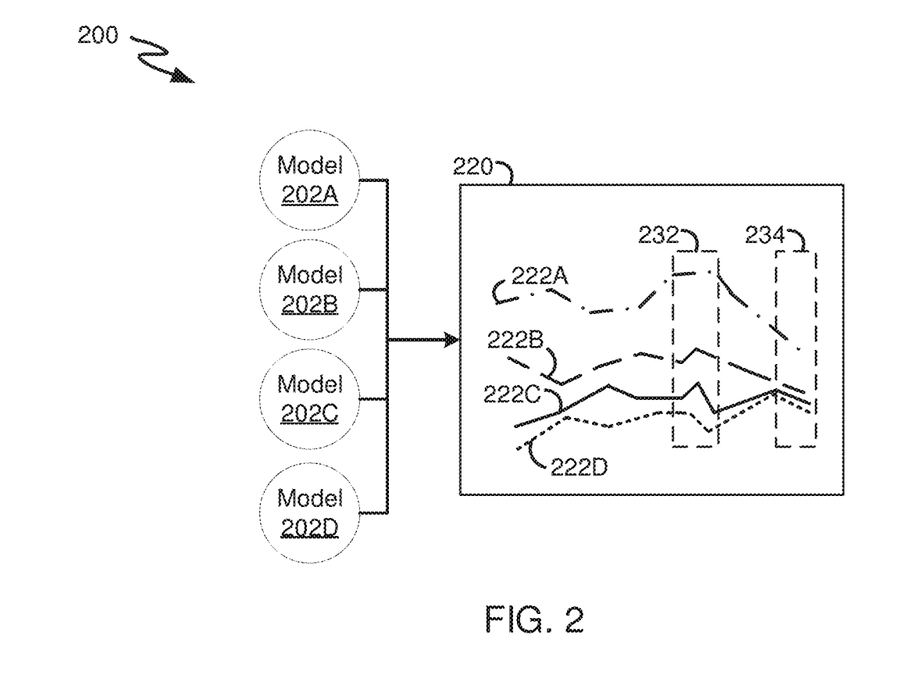
FIG. 2 illustrates an example of variance in outputs from machine learning models.

Referring to FIG. 2, a plurality of models 202A, 202B, 202C, and 202D are trained as described herein to output predictions for one or more parameters related to a wellbore. In some embodiments, models 202A, 202B, 202C, and 202D were trained using training data including formation and/or wellbore attributes relating to a plurality of depth points along a wellbore in a formation. In certain embodiments, the training data may further include waveform data in a plurality of directions with respect to each depth point of the plurality of depth points. The plurality of directions may include, for example, up and down (e.g., in Z space), and/or left, right, forward and backward (e.g., in XY space).

In certain embodiments, each training input was associated with a corresponding label. For example, the training inputs may include one or more attributes related to a wellbore that have been measured or determined based on measured data, and the labels may comprise different properties related to the wellbore that are to be output by a machine learning model. It is noted that "labels" are only included as one example for training a machine learning model, and other techniques may be used to train a machine learning model based on attributes at depth points and adjacent waveforms. In certain embodiments, the attributes are captured by various sensors during a drilling or reservoir stimulation operation. In certain embodiments, the attributes also include attributes derived from measurements, such as synthetic logs.

In certain embodiments, the training data may include a wide variety of information types, including seismic volumes (both pre- and post-stack), seismic geologic maps, seismic images, electromagnetic volumes, checkshots, gravity volumes, horizons, synthetic log data, well logs, mud logs, gas logs, fluid samples, well deviation surveys, isopachs, vertical seismic profiles, microseismic data, drilling dynamics data, initial information from wells, core data, gamma, temperature, torque, differential pressure, standpipe pressure, mud weight, downhole accelerometer data, downhole vibration data, gamma, resistivity, neutron, density, compressional, and/or shear logs, and combinations thereof.

In certain embodiments, each of models 202A, 202B, 202C, and 202D may be an artificial neural network, deep neural network, deep belief network, recurrent neural network, convolutional neural network, or the like. It is noted that these are only included as examples and other types of machine learning models may be used with techniques described herein. In certain embodiments, each of the machine learning models may be selected from a plurality of candidate machine learning models. In some embodiments, models 202A, 202B, 202C, and 202D are instances of the same machine learning model. The instances may have been trained with different subsets of training data, may have different model parameters (e.g., hyperparameters), and/or may be initialized with different values. In some embodiments, all of models 202A, 202B, 202C, and 202D have been trained using the same training data.

Once trained, models 202A, 202B, 202C, and 202D are provided with input data (e.g., data measured in real-time). For example, the same set of input data may be provided as inputs to each of models 202A, 202B, 202C, and 202D. As shown in graph 220, model 202A produces output 222A, model 222B produces output 222B, model 202C produces output 222C, and model 202D produces output 222D. Outputs 222A-D generally represent sequences of predictions for a given parameter at subsequent depth points. As shown, the outputs 222A-D are not identical, as each of models 202A-D produces a different sequence of predictions (e.g., due to differences in training, parameters, initialization, and the like).

In some places within graph 220 the variance among outputs 222A-D is greater than it is in other places. For instance, section 232 of graph 220 contains a higher amount of variance than section 234. As such, according to certain embodiments, confidence values for the predictions represented in section 232 may be lower than confidence values for the predictions represented in section 234. Accordingly, a confidence volume may indicate a higher level of confidence for the predictions represented in section 234 of graph 220 than for the predictions represented in section 232 of graph 220.

In some embodiments, the confidence values may be used to produce improved machine learning models, improved earth models, improved well placement, and/or the like. For instance, because model 202A produced output 222A that was more of an outlier compared to outputs 222B-D, model 202A may be excluded from the ensemble. Alternatively, model 202A may be retrained, such as until it produces output that is more in line with the outputs from the other models 202B-D. In other embodiments, confidence is used as part of an ensemble algorithm that is used to combine outputs from an ensemble of models to produce a final output. In other embodiments, all of outputs 222A-D are provided to a user along with confidence values, and the user is enabled to make improved decisions based on the confidence values.

As mentioned above, higher variance may not always equal lower confidence. In some cases, variance may be seen as an indicator of higher confidence. For example, a diversity of model outputs may provide a broader array of possible values, and may allow for more thorough contingency planning. As such, some embodiments involve assigning higher confidence values to predictions with higher amounts of variance.

In certain embodiments, the training data for models 202A, 202B, 202C, and 202D may be updated each time new measurements are recorded. In certain embodiments, the training data may be updated at predetermined drilling intervals, such as intervals from about 5 ft to about 100 ft, such as intervals from about 25 ft to about 75 ft, such as intervals of about 50 ft. In certain embodiments, the training data may be updated at pre-determined time intervals, such as intervals from about 5 min to about 120 min, such as intervals from about 30 min to about 90 min, such as intervals of about 60 min.

In certain embodiments, multiple instances of a machine learning model may share at least one of: common learning algorithms, common architectures, common input information types, common variables, common biases, common weighting matrices, common objective functions, common hyperparameters related to numbers of iterations, common numbers of hidden layers and nodes, common connections between layers and nodes, and common functions associated with nodes. In some embodiments, multiple instances of a machine learning model may represent at least one of: different depth points in the formation, different positions along the wellbore, different directions, different time intervals, and different data sets. In certain embodiments, multiple instances of a machine learning model may only differ by representing different physical positions and/or time intervals. In some embodiments, multiple instances of a machine learning model may only differ with regard to their respective training data sets. In certain embodiments, one instance of a machine learning model may only differ by including updated training data. In certain embodiments, different instances of a machine learning model may share at least one of: common positions along the wellbore, common directions, common time intervals, and common data sets.

An earth model may be generated based on output values from at least one of models 202A, 202B, 202C, and 202D, or a combination thereof. In some embodiments, confidence values are used as part of the earth model generation process. For example, the machine learning models may output one or more parameters such as geomechanical, wellbore stability, pore pressure, and/or petrophysical attributes from an output layer. The parameters output by the models may include parameters with respect to the at least one depth point and parameters related to a plurality of directions with respect to the at least one depth point, such as up, down, left, right, forward, and/or backward. The earth model can be a high-resolution earth model due to the use of machine learning models to process a wide variety of inputs that provide a detailed picture of the well.

One or more drilling operations may be adjusted according to the earth model and/or the confidence values. A drilling operation may be selected from: a well placement, a well trajectory, a mud weight, a backpressure, a pumping rate, a fluid composition, a casing depth, a weight on bit, a torque on bit, a bit speed, a tripping speed, a rate of penetration (ROP), and combinations thereof.

Conventional techniques receive log data in a depth domain and seismic data in a time domain. A process of tying is used to accurately relate the seismic data to the log data, usually by converting the seismic data to the depth domain using conventional depth to time conversion algorithms, such as a time-depth curve. In addition, creating well ties can involve seismic image processing, wavelet creation, geologic interpretation, and manual corrections. Thus, converting seismic data to the depth domain is a slow process. Aspects of the present disclosure can avoid the need to convert data between the time domain and the depth domain. Furthermore, aspects of the present disclosure can automate and accelerate the creation of well ties. Thus, the present disclosure can facilitate use of real-time earth models that include seismic data in the time domain instead of the depth domain. In certain embodiments, operations described herein can be improved by relating data between different measurement domains in real-time. For instance, in order to effectively use earth models that are updated during drilling, conventional and time-consuming processes to convert data between domains of time and depth can be avoided.

Figure 3:
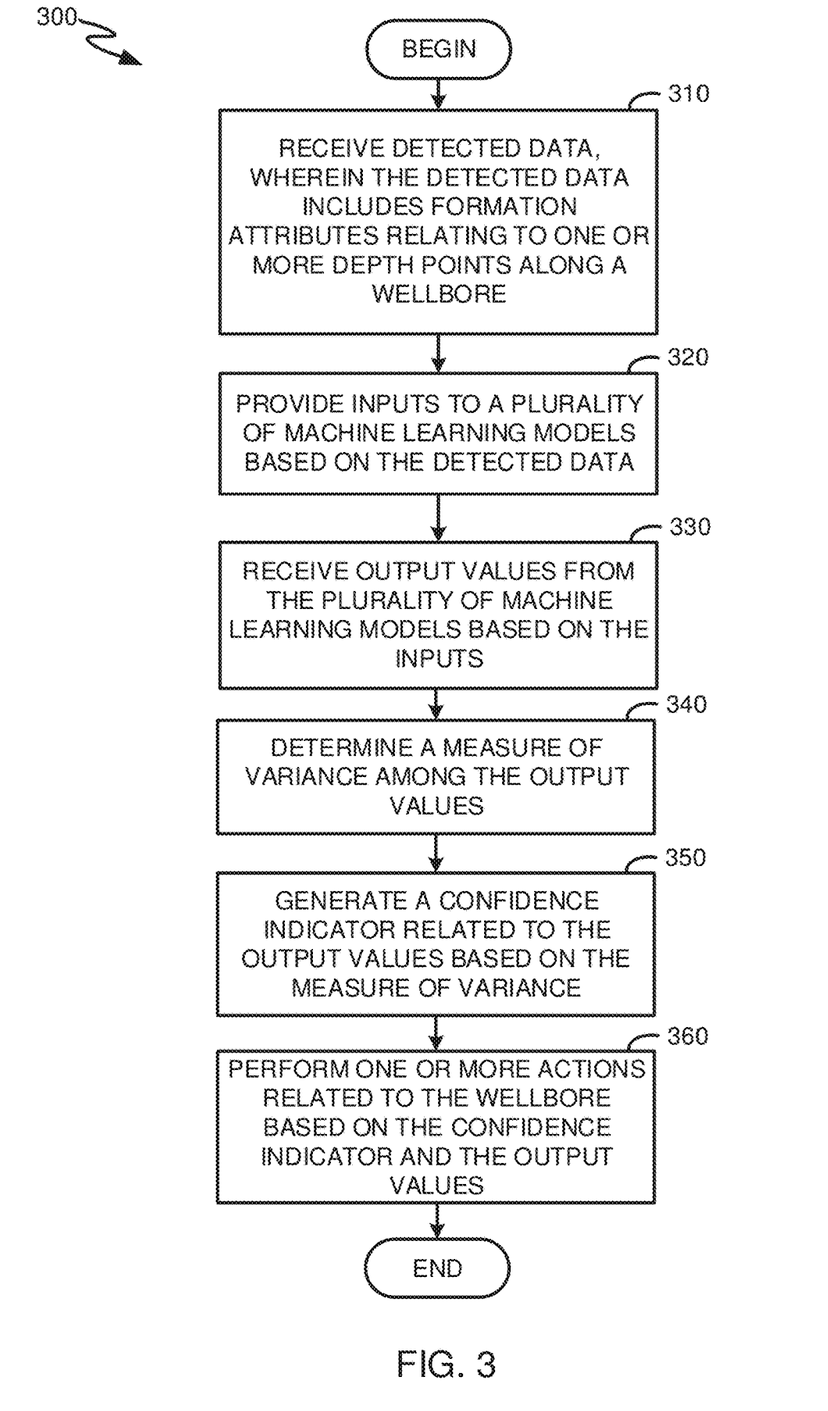
FIG. 3 illustrates example operations for using variance in outputs from machine learning models as a measure of confidence to improve processes related to a wellbore.

FIG. 3 depicts example operations 300 for using variance in outputs from machine learning models as a measure of confidence to improve processes related to a wellbore.

Operations 300 begin at block 310, where detected data is received, wherein the detected data includes formation attributes relating to one or more depth points along a wellbore.

In certain embodiments, the detected data includes seismic data that is acquired using geophones placed in a wellbore. In certain embodiments, acquisition of the seismic data can involve geophones, hydrophones, and/or seismometers positioned on the surface of the earth, at the seafloor, and/or subsea. In certain embodiments, a source having suitable type and intensity generates acoustic or elastic vibrations that travel through strata having different seismic responses. The vibrations are recorded by receivers having suitable configuration and orientation with respect to geological features. In certain embodiments, the seismic data can include 2D or 3D reflection, shear wave, refraction, velocity or anisotropy fields generated during imaging, and combinations thereof.

The detected data may also include log data in a depth domain. In certain embodiments, the log data can be measured using a logging while drilling (LWD) tool. In other embodiments, the log data can be measured using another logging tool suspended in the wellbore on wireline. In certain embodiments, the logging tool may include one or more induced nuclear sondes, such as a PNC sonde (aka pulsed neutron lifetime (PNL) sonde and/or carbon/oxygen sonde), a density (aka gamma-gamma) sonde, a neutron porosity sonde, or combinations thereof. As is known in the art, induced nuclear sondes, density sondes, and neutron porosity sondes are tools that contain radioactive sources. The logging tool may also include one or more passive (aka natural) nuclear sondes that do not contain radioactive sources, such as a gamma ray sonde, a spectral gamma ray sonde, or combinations thereof. The logging tool may also include one or more nonnuclear sondes, such as a spontaneous potential (SP) sonde, a resistivity sonde, a sonic sonde, a nuclear magnetic resonance sonde, a caliper sonde, a temperature sonde, and combinations thereof.

In certain embodiments, the detected data can be processed to determine one or more elastic property logs (aka mechanical property log or rock strength log) of the formation, such as Poisson's ratio, Young's modulus, shear modulus, bulk modulus, Biot's constant, Lame's constant, modulus of compressibility, brittleness index, rock strength, and combinations thereof. The detected data may also be processed to determine one or more other property logs of the formation, such as a density log, a sonic velocity log (shear and/or compressional), a production index log, and combinations thereof. In certain embodiments, a depth of the logging tool may be monitored by a position sensor in communication with a rig winch. A cable head may connect the logging tool to the wireline and include a load cell for monitoring tension in the wireline to compensate the measured depth for tension induced extension of the wireline. The logging tool may be located at a vertical end of the formation and operated while raising or lowering the logging tool to the other vertical end of the formation. Thus, by using the depth measurement of the logging tool, each of the foregoing logs are recorded in the depth domain. Thus, the log data cannot be directly related to the seismic data which is in the time domain. Instead, a conversion is needed between the time domain and the depth domain. In practice, the seismic data is converted to the depth domain; however, data conversion can be a slow process.

It is noted that these are included as examples of detected data, and other types of detected data may also be included.

Operations 300 continue at block 320, where inputs are provided to a plurality of machine learning models based on the detected data. The plurality of machine learning models may be different instances of the same machine learning model or different machine learning models. The inputs provided to each machine learning model may be based on different subsets of the detected data, the same subsets of the detected data, all of the detected data, or the like. The machine learning models may be initialized with the same or different values (e.g., of hyperparameters).

Operations 300 continue at block 330, where output values from the plurality of machine learning models are received based on the inputs. For example, each of the plurality of machine learning models may output predictions for one or more parameters, such as for a sequence of depth points. Due to differences in the plurality of machine learning models, the output values may differ between models.

Operations 300 continue at block 340, where a measure of variance among the output values is determined. In some embodiments, variance for a particular depth point is calculated based on a mean of the output values for the particular depth point. In certain embodiments, standard deviation may also be determined.

Operations 300 continue at block 350, where a confidence indicator related to the output values is determined based on the measure of variance. The confidence indicator may include a confidence value for each prediction from each model, a confidence value for all models for each depth point, a confidence value for each prediction resulting from an ensemble algorithm for each depth point, and/or the like. In some embodiments, the confidence indicator may comprise a confidence volume.

In certain embodiments, a confidence value is higher for a lower amount of variance and lower for a higher amount of variance, while in other embodiments a confidence value may be lower for a lower amount of variance and higher for a higher amount of variance. Confidence values may, for example, be normalized such that they fall between 0 and 1.

Operations 300 continue at block 360, where one or more actions related to the wellbore are performed based on the confidence indicator and the output values. The one or more actions may include, for example, generating an earth model, modifying an earth model, re-training one or more machine learning models, discarding one or more machine learning models, selecting one or more predictions, adjusting one or more operations related to drilling, performing an ensemble process, providing output to a user, and/or the like.

Figure 4:
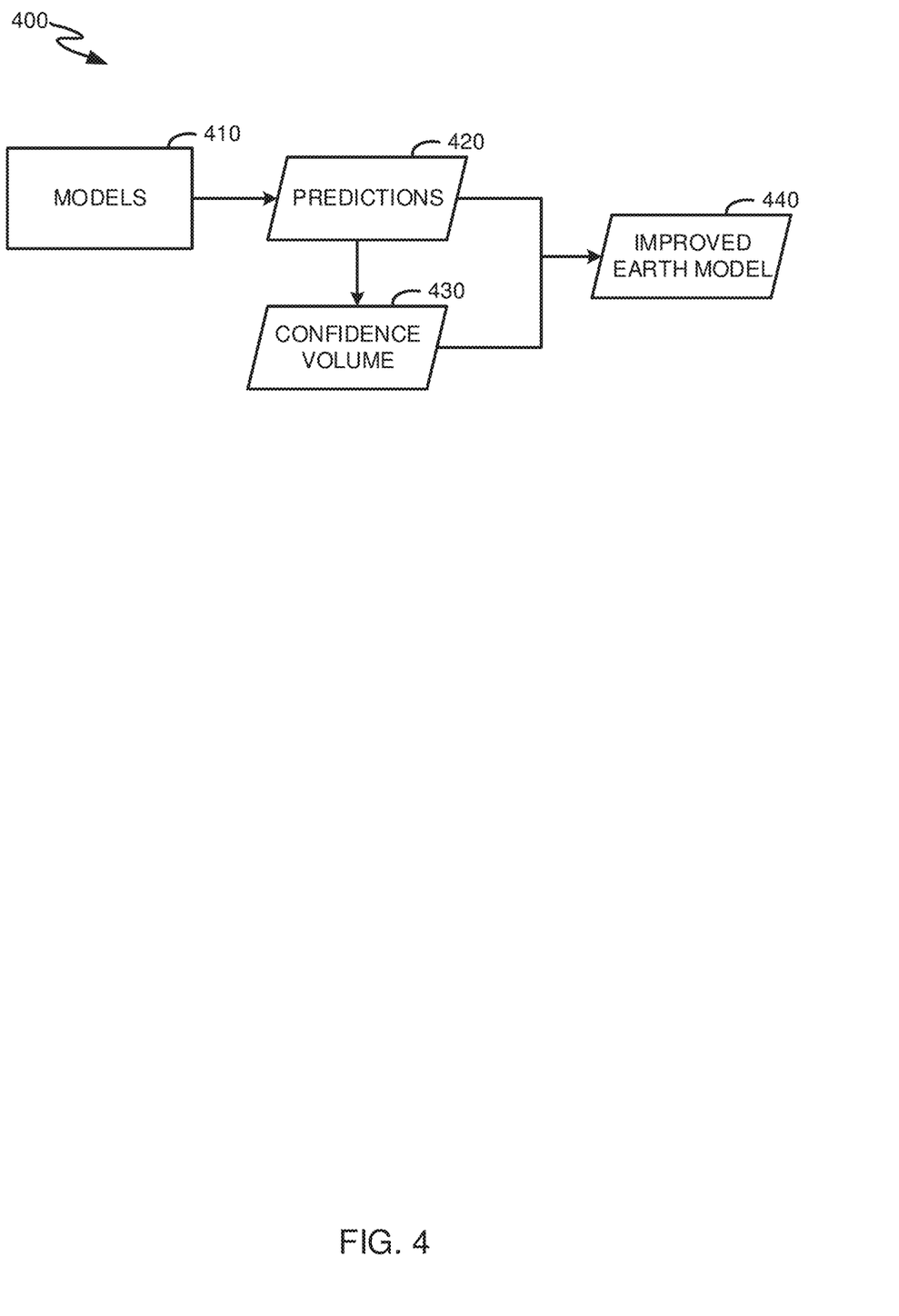
FIG. 4 illustrates an example of improved earth modeling through the use of a confidence volume.

FIG. 4 is an illustration 400 of improved earth modeling through the use of a confidence volume.

Models 410 may include a plurality of machine learning models and/or instances of the same machine learning model. Models 410 have been trained according to techniques described herein to receive detected data as inputs and to output, in response to the inputs, predicted values for one or more parameters relating to one or more depth points.

Models 410 output predictions 420, which may include sequences of predictions for given parameters at different depth points. A confidence volume 430 may be generated for predictions 420 based on variance among predictions 420. For example, confidence volume 430 may indicate a level of confidence for predictions at each of a plurality of depth points, such as through differences in color, style, shading, or other visual aspects. In one example, a first color represents low confidence and a second color represents high confidence, and shades between the two colors represent intermediate levels of confidence. In some embodiments, confidence volume 430 includes numerical values for confidence, such as normalized values between 0 and 1. In certain embodiments, confidence volume 430 indicates a standard deviation related to the predictions, such as in the form of an upper bound and a lower bound. It is noted that standard deviation is included as one example, and other techniques may be used with embodiments of the present disclosure. For example, a confidence indicator such as confidence volume 430 may be a probabilistic volume. In certain embodiments, a certain percentile calculation may be used to determine a confidence indicator, such as P10, P50, or P90 (e.g., $10^{th}$, $50^{th}$, or $90^{th}$ percentile determinations), or the like.

Predictions 420 and confidence volume 430 are used to produce an improved earth model 440. In some embodiments, a confidence indicator may be inputted into a reservoir model. In some cases, confidence volume 430 may be used as part of an ensemble algorithm to produce final predictions based on predictions 420, and the final predictions may be used to generate improved earth model 440. In certain embodiments, confidence volume 430 is used to eliminate or select certain subsets of predictions 420. In some embodiments, confidence volume 430 is used to adjust models 410, such as by eliminating models, selecting models, re-training models, adjusting parameters of models, and/or the like. In certain embodiments, confidence volume 430 is output to a user along with earth model 440 for use in improved decision-making. In some embodiments, confidence volume 430 and predictions 420 are used to adjust drilling parameters in real-time, such as through an automated and/or manual process.

In certain embodiments, ensemble selection can be based on minimizing validation error based on reference measurements. However, reference measurements are usually unavailable, and instead, selection can be based on observable measurements as follows. An optimization algorithm may be used to select a first ensemble of a plurality of candidate ensembles, where the optimization algorithm evaluates each candidate ensemble on a multi-objective function. In certain embodiments, the optimization algorithm is based at least in part on a relationship between physical formation attributes. In certain embodiments, pertinent physical formation attributes can include a relationship between compression and sonic shear, a relationship between compressional strength and density, a relationship between wave speeds of p- and s-waves, a relationship between DTC and density, and combinations thereof. For example, compression and sonic shear can have a positive proportional relationship, such that increasing compression is correlated to increasing sonic shear when the rock becomes stiff. Likewise, compressional strength and density can have a positive proportional relationship, such that increasing compressional strength is correlated to increasing density. In certain embodiments, ensembles that fail to satisfy the foregoing physical relationships are less likely to be selected. In certain embodiments, the optimization algorithm can be or include genetic algorithms, evolution strategies, evolutionary programming, simulated annealing, Gaussian adaptation, hill climbing, swarm intelligence, methods based on integer linear programming, other suitable algorithms, or combinations thereof. In certain embodiments, in addition to an optimization algorithm, any derivative-free algorithm can be used. In certain embodiments, trial and error can be used for a small number of candidate ensembles. In certain embodiments, selecting a first ensemble of the plurality of candidate ensembles can include selecting an ensemble where model outputs of sections already drilled through stay as constant as possible from one run to the next.

In some embodiments, ensembles that produce a lower (or higher) amount of variance are selected or favored. In certain embodiments, machine learning models that contribute significantly to variance (e.g., by producing outputs that are outliers with respect to other machine learning models) are excluded from an ensemble or disfavored for inclusion in an ensemble.

In certain embodiments, a multi-objective function includes an optional prediction error value evaluated on the training data. In certain embodiments, the multi-objective function includes an optional complexity value corresponding to averaged sum-squared-weights of each candidate ensemble. In certain embodiments, the optional complexity value can be a penalty term. In certain embodiments, the multi-objective function includes an optional out-of-range value corresponding to a difference between the training data and simulation outputs of each candidate ensemble. In certain embodiments, the multi-objective function includes an optional cross-correlation value corresponding to a difference between first and second simulation outputs of each candidate ensemble. In certain embodiments, the optional cross-correlation value can involve relationships between formation attributes, such as compression-sonic shear, compressional strength-density, p-wave speed-s-wave speed, DTC-density, and combinations thereof. In certain embodiments, cross-correlation can only apply to MO models. In certain embodiments, the multi-objective function includes an optional negative correlation value to measure the product of deviated simulation outputs of each particular member network and the sum of deviated simulation outputs of other member networks. In certain embodiments, the deviated simulation output is the difference between the member network output and the ensemble output averaged over all the member network outputs. In certain embodiments, adding weights on negative correlations can encourage construction of ensembles with diverse member network outputs to minimize the uncertainty of ensemble simulation outputs on the new data. In certain embodiments, the first ensemble of the plurality of candidate ensembles is an ensemble that most optimizes the multi-objective function. The weighting factors on multi-objective functions can vary depending on the optimization data selection. In certain embodiments, the ensemble selected to optimize the simulation of a known testing well can be directly used to predict the outputs of a nearby blind well. In other embodiments, ensemble switching can be applied by selecting different member networks from the same candidate model base in simulating outputs of various blind wells. In certain embodiments, the candidate networks are trained with MO structure, but the ensemble selection can be SO based, to best optimize simulation of each SO without remodeling candidate networks using SO structure.

A confidence of a given ensemble can be assessed with other ensembles sorted from multiple solutions through an optimization process. In some aspects, the confidence of the ensemble output is much higher than a single network output. The variance in simulation outputs of different ensembles is lower than the variance in outputs of different individual networks. Compared to single network realization, the uncertainty of ensemble simulation can be reduced even if a less optimal ensemble is selected. In certain embodiments, the confidence can be determined on any 2D plane or full volume simulation file. In certain embodiments, outputs can be scaled from about −10 to about 10 before calculating variance. Scaling accounts for different outputs having different magnitudes. In certain embodiments, confidence is greater closer to a wellbore. In certain embodiments, confidence plots can be used to monitor performance of various models Improved earth model 440 can be generated using techniques described herein without limitation. In certain embodiments, earth models generated using a modeling ensemble compared to a single model can improve results across varied formation types, depths, conditions, etc. Functionally, ensemble implementation in this disclosure applies multiple neural network filters to variable inputs in ruggedizing output simulation. The utilization of a diverse model base overcomes the limitations associated with single network such as hyperparameter initialization, complexity determination, and input selection. Ensemble construction through evolutionary computation acts as the secondary modeling to incorporate multi-objective optimization into member network selection that cannot be achieved with conventional neural network training. In practice, the same member network can be present more than once for a given ensemble, providing a weighted average in ensemble output. By optimizing the number of member networks that constitute an ensemble, the simulated ensemble output can be more accurate on average than a single network prediction in modeling and testing without losing resolution.

As mentioned earlier, conventional earth models are not often updated and/or are updated at a frequency that is less than optimal. Aspects of the present disclosure can provide updating of earth models in real-time, on-demand, and/or at any suitable frequency. In certain embodiments, earth models of the present disclosure can be updated within minutes, such as about 10 min or less, such as about 5 min or less.

Figure 5:
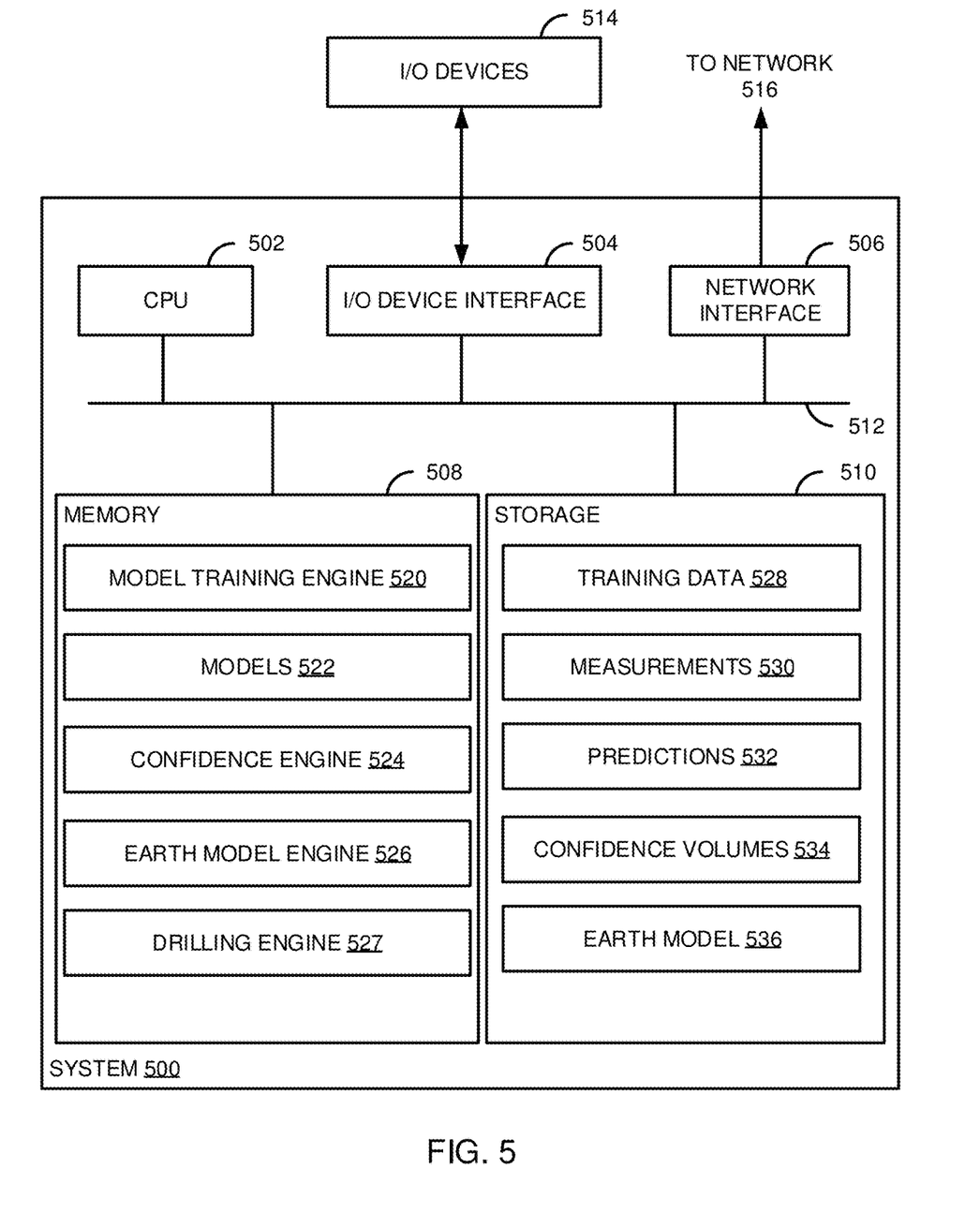
FIG. 5 illustrates an example computer system for implementing embodiments of the present disclosure.

FIG. 5 illustrates an example computer system 500 for implementing embodiments of the present disclosure. As shown, the system 500 includes a central processing unit (CPU) 502, one or more I/O device interfaces 504 that may allow for the connection of various I/O devices 514 (e.g., keyboards, displays, mouse devices, pen input, etc.) to the system 500, a network interface 506, memory 508, storage 510, and an interconnect 512.

The CPU 502 may retrieve and execute programming instructions stored in the memory 508. Similarly, the CPU 502 may retrieve and store application data residing in the memory 508. The interconnect 512 transmits programming instructions and application data, among the CPU 502, the I/O device interface 504, the network interface 506, the memory 508, and the storage 510. The CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN). The memory 508 can include, for example, a model training engine 520, one or more machine learning models 522, a confidence engine 524, an earth model engine 526, and a drilling engine 527. The storage 710 can include, for example, training data 528, measurements 530, predictions 532, confidence volumes 534, and an earth model 536.

In certain embodiments, the model training engine 520 can use the training data 528 and/or the measurements 530 for training the one or more machine learning models 522, for example using supervised learning techniques described herein. In certain embodiments, the measurements 530 can be recorded during drilling and used in real-time. In certain embodiments, machine learning models 522 output predictions 532, such as in response to inputs that are based on measurements 530. In come embodiments, confidence engine 524 determines confidence for predictions 532 based on variance among outputs from different machine learning models 522. In certain embodiments, confidence engine 524 produces confidence volumes 534, which indicate confidence related to predictions 532. In some embodiments, the earth modeling engine 536 can generate one or more earth models 536, such as based on predictions 532 and/or confidence volumes 534. In certain embodiments, the drilling engine 527 can generate one or more drilling control instructions to control drilling, such as based on the one or more earth models 536 and/or confidence volumes 534.

One or more of the model training engine 520, one or more machine learning models 522, a confidence engine 524, an earth model engine 526, and a drilling engine 527 in memory 508 may communicate with other devices (e.g., components of a drilling system) over a network 516 (e.g., the internet, a local area network, or the like) through network interface 506 (e.g., in order to receive measurements, provide output and instructions, and the like).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The invention claimed is:

1. A method, comprising:
   receiving detected data, wherein the detected data includes formation attributes relating to one or more depth points along or near a wellbore;
   providing inputs to a plurality of machine learning models based on the detected data, wherein each machine learning model of the plurality of machine learning models has been trained through an iterative supervised learning process based on labeled training data and a corresponding objective function;
   receiving output values from the plurality of machine learning models based on the inputs;
   determining a measure of variance among the output values;
   generating a confidence indicator related to the output values based on the measure of variance;
   omitting a subset of the plurality of machine learning models from an ensemble of machine learning models based on:
      the confidence indicator; and
      a determination of whether a subset of the output values corresponding to two physical formation attributes satisfy a known relationship between the two physical formation attributes; and
   using the ensemble of machine learning models to determine an adjustment to a drilling or reservoir operation, wherein the adjustment to the drilling or reservoir operation comprises a change to: a well placement, a well trajectory, a mud weight, a backpressure, a pump rate, a fluid composition, a casing depth, a weight on bit, rotations per minute, flow rate, a torque on bit, a bit speed, a tripping speed, a rate of penetration, reservoir simulation, artificial lift, water injection, gas injection, enhanced recovery, controlling water production, zonal isolation, or well workover.

2. The method of claim 1, further comprising selecting a subset of the output values based on the confidence indicator.

3. The method of claim 1, further comprising displaying the confidence indicator to a user via a user interface.

4. The method of claim 1, wherein generating the confidence indicator related to the output values based on the measure of variance comprises generating a confidence volume for the wellbore.

5. The method of claim 4, wherein the confidence volume indicates standard deviations with respect to the output values.

6. The method of claim 4, wherein the confidence volume is a probabilistic volume.

7. The method of claim 4, wherein the confidence volume is inputted into a reservoir model.

8. The method of claim 1, wherein the detected data comprises one or more information types selected from the group consisting of: seismic volumes, seismic geologic maps, seismic images, electromagnetic volumes, checkshots, gravity volumes, horizons, synthetic log data, well logs, mud logs, gas logs, fluid samples, well deviation surveys, isopachs, vertical seismic profiles, microseismic data, drilling dynamics data, initial information from wells, core data, gamma, temperature, torque, differential pressure, standpipe pressure, mud weight, downhole accelerometer data, downhole vibration data, gamma, resistivity, neutron, density, compressional, or shear logs.

9. A system, comprising: one or more processors; and a memory comprising instructions that, when executed by the one or mom processors, cause the system to perform a method, the method comprising:
receiving detected data, wherein the detected data includes formation attributes relating to one or more depth points along or near a wellbore;
providing inputs to a plurality of machine learning models based on the detected data, wherein each machine learning model of the plurality of machine learning models has been rained through an iterative supervised learning process based on labeled training data and a corresponding objective function;
receiving output values from the plurality of machine learning models based on the inputs;
determining a measure of variance among the output values;
generating a confidence indicator related to the output values based on the measure of variance;
omitting a subset of the plurality of machine learning models from an ensemble of machine learning models based on:
the confidence indicator; and
a determination of whether a subset of the output values corresponding to two physical formation attributes satisfy a known relationship between the two physical formation attributes; and
using the ensemble of machine learning models to determine an adjustment to a drilling or reservoir operation, wherein the adjustment to the drilling or reservoir operation comprises a change to: a well placement, a well trajectory, a mud weight, a backpressure, a pump rate, a fluid composition, a casing depth, a weight on bit, rotations per minute, flow rate, a torque on bit, a bit speed, a tripping speed, a rate of penetration, reservoir simulation, artificial lift, water injection, gas injection, enhanced recovery, controlling water production, zonal isolation, or well workover.

10. The system of claim 9, wherein the method further comprises selecting a subset of the output values based on the confidence indicator.

11. The system of claim 9, wherein the method further comprises displaying the confidence indicator to a user via a user interface.

12. The system of claim 9, wherein generating the confidence indicator related to the output values based on the measure of variance comprises generating a confidence volume for the wellbore.

13. The system of claim 12, wherein the confidence volume indicates standard deviations with respect to the output values.

14. The system of claim 12, wherein the confidence volume is a probabilistic volume.

15. A non-transitory computer-readable medium comprising instructions that, when executed by one or more processors of a computing system, cause the computing system to perform a method, the method comprising:
receiving detected data, wherein the detected data includes formation attributes relating to one or more depth points along or near a wellbore;
providing inputs to a plurality of machine learning models based on the detected data, wherein each machine learning model of the plurality of machine teaming models has been trained through an iterative supervised learning process based on labeled training data and a corresponding objective function;
receiving output values from the plurality of machine learning models based on the inputs;
determining a measure of variance among the output values;
generating a confidence indicator related to the output values based on the measure of variance;
omitting a subset of the plurality of machine learning models from an ensemble of machine learning models based on:
the confidence indicator; and
a determination of whether a subset of the output values corresponding to two physical formation attributes satisfy a known relationship between the two physical formation attributes; and
using the ensemble of machine learning models to determine an adjustment to a drilling or reservoir operation, wherein the adjustment to the drilling or reservoir operation comprises a change to: a well placement, a well trajectory, a mud weight, a backpressure, a pump rate, a fluid composition, a casing depth, a weight on bit, rotations per minute, flow rate, a torque on bit, a bit speed, a tripping speed, a rate of penetration, reservoir simulation, artificial lift, water injection, as injection, enhanced recovery, controlling water production, zonal isolation, or well workover.

* * * * *